March 7, 1939.  R. GODFREY  2,149,673

MEANS FOR CONTROLLING THE FLOW OF FLUIDS

Filed Dec. 19, 1935

R. Godfrey
INVENTOR

By Glascock Downing &Seebold
Attys.

Patented Mar. 7, 1939

2,149,673

UNITED STATES PATENT OFFICE 2,149,673

MEANS FOR CONTROLLING THE FLOW OF FLUIDS

Richard Godfrey, Cheadle Heath, Stockport, England

Application December 19, 1935, Serial No. 55,257
In Great Britain December 21, 1934

3 Claims. (Cl. 50—13)

This invention relates to means for controlling the flow of fluids, more particularly gases, and has for its principal object to provide an improved device of simple and relatively inexpensive construction for maintaining or tending to maintain a constant flow of fluid under varying conditions in the systems between which the flow takes place.

Another object is to provide an improved control means particularly for controlling the supply of gas (or air) to gas lift wells and a further object is to provide an improved control arrangement particularly suited to the supply of gas to a number of gas lift wells from a common source.

Another object is to provide for constant flow of gas through a valve under varying conditions of pressure on the delivery side of the valve.

According to the invention the fluid is passed through an orifice and a controlling valve means in succession and the valve means is actuated by a flexible diaphragm or equivalent means responsive to the pressure difference across the orifice so that an increase in such pressure difference tends to close the valve and a decrease in such pressure difference tends to open the valve.

The pressure difference acting upon the diaphragm or the like may be balanced by spring means adjustable as to tension to afford different controlled rates of flow.

Preferably the controlling valve means comprises a valve of the balanced or double beat type.

The invention also consists in a device for controlling the flow of fluids comprising a valve actuated in accordance with the position of a movable member such as a diaphragm or the like having an orifice therein through which the fluid flows to the valve, and in a preferred form the valve is held open by a spring or other resiliently acting means against a force due to the differential pressure on the diaphragm or its equivalent.

The orifice which determines the rate or flow by creating the pressure difference utilized for controlling the position of the valve may conveniently be formed in the flexible diaphragm itself or alternatively in a member secured or connected to the diaphragm. Where the latter arrangement is adopted the orifice is preferably disposed at an inclination to the central axis of the diaphragm and in line with an opening in the casing which is normally closed by means of a removable plug or the like. The orifice may be formed in a threaded or otherwise detachable member which is accessible through the opening above referred to, thereby permitting removal of the orifice member and its replacement by one of different size without the necessity of dismantling the device.

According to a further modification, means may be provided for adjustably varying the cross-section of the orifice and such means may comprise a pivoted or sliding shutter which may be actuated by suitable means from outside the casing of the device.

The invention also comprises an installation or equipment for the control of gas lift or air lift wells in which a device having any or all of the characteristics defined in the preceding six paragraphs is provided in the supply line between the compressor or other source of pressure fluid and the gas connection of the gas lift well. Where a number of wells are supplied with gas or air for lifting purposes from a single compressor or pressure system, each well is provided with a separate controlling device. Preferably the control device is connected to the line with a by-pass which is controllable by a valve so that when starting up the well or "kicking off" by the application of a higher pressure than is employed during normal operation the control device may be by-passed and thus rendered inoperative.

Referring to the accompanying drawing:—

Figure 1:
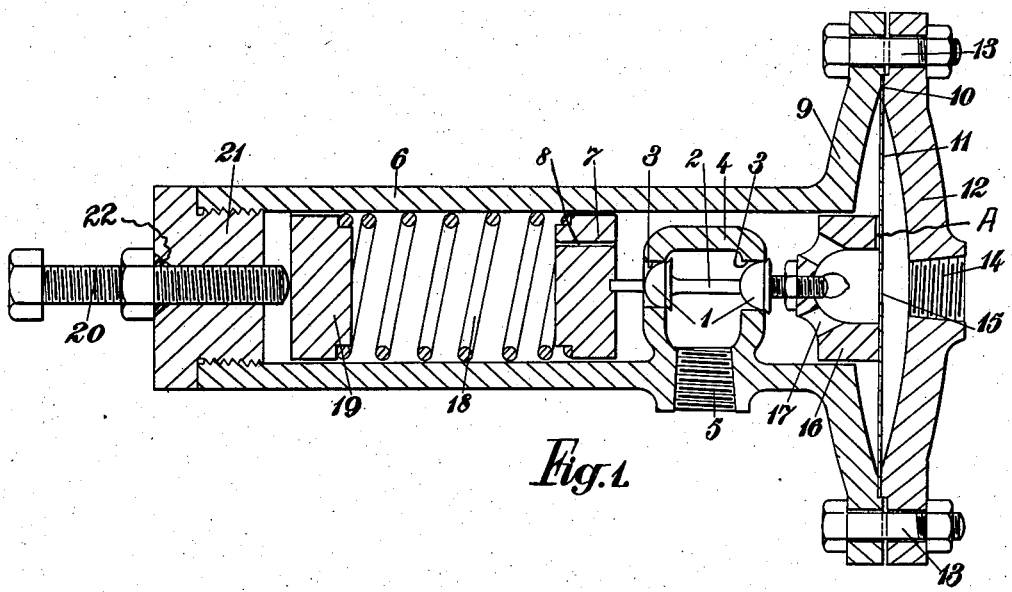
Figure 1 is a cross-sectional elevation of a flow controlling device constructed in accordance with the invention.

In carrying the invention into effect according to one convenient mode as applied to the automatic control of an air or gas supply under pressure, reference is made to Figure 1 of the drawing which shows a flow controlling device suitable for controlling the supply of gas or air to gas lift wells such as oil wells. A double beat balanced valve comprising a pair of movable valve members 1 carried by a spindle 2 is arranged to co-operate with apertured valve seats 3 in a chamber 4 which has an outlet 5 and is arranged within and formed in one with the cylindrical casing 6. An extension of the spindle 2 rests in a recess centrally located in a cylindrical guide member 7 of piston form slidable in the cylindrical casing 6 and provided with an aperture 8. This guide member forms a support and guide for the valve spindle. The casing 6 which surrounds the chamber 4 containing the valve seats 3 forms an extension of an enlarged portion 9 having an annular seat 10 for receiving a flexible diaphragm 11. A cover 12 held in place by bolts 13 secures the diaphragm in position and is provided with a central aperture 14 which constitutes the gas inlet. This aperture may be internally threaded as shown or otherwise formed to enable a suitable pipe connection to be made thereto.

The flexible diaphragm 11 is provided with a central orifice 15 which lies opposite the inlet aperture 14 in the cover and is preferably coaxial therewith.

A second guide member 16 in the form of a hollow piston is slidably arranged in that portion of the casing 6 lying adjacent the diaphragm 11 and is secured to the double beat valve assembly by any suitable means. The hollow interior of the guide member 16 is of considerably larger diameter than the orifice 15 of the diaphragm and presents an end surface grooved to permit pressure communication to the down stream side of the orifice and adapted to engage with the diaphragm outside the said orifice. Apertures 17 are provided in the guide member 16 which afford unobstructed communication between the orifice 15 and the double beat valve.

At the opposite end of the casing a loading spring 18 is interposed between the slidable guide member 7 and a slidable abutment 19, the latter being capable of adjustment by means of a bolt 20 threaded into a plug 21 which closes the end of the casing. The bolt 20 is provided with a sealing ring 22.

The arrangement of the various parts of the device is such that the force of the compressed loading spring 18 tends to maintain the double beat valve in open position and also to force the guide member 16 against the flexible diaphragm 11. The inlet 14 is connected to the supply of gas and the gas passes through the orifice 15, thence through the apertures 17 and the double beat valve and so to the outlet 5. In its passage through the orifice 15 the gas creates a differential pressure and the resultant force on the diaphragm tends to displace the guide member 16 towards the left as viewed in the drawing and against the force of the spring 18 which maintains the guide member in engagement with the diaphragm. Thus the valve will always set itself into a position in which the pressure difference acting on the diaphragm is equal to the opposed spring force and if the flow of fluid should increase this will mean that there is a greater pressure drop across the orifice 15 and consequently a larger force which will overcome the force exerted by the spring 18 and move the valve to the left, thereby reducing the flow until equilibrium is again reached. Conversely if the flow is reduced for any reason, for example if the pressure on the outlet side of the device should build up, the pressure on the diaphragm will be less and the spring will move the valve to increase the opening there through and thus increase the flow.

It will be appreciated that the dimensions of the diaphragm, the orifice, the spring and the arrangement of the valve will be predetermined to give the desired results in accordance with the range of pressure over which the device is required to operate. By adjusting the tension of the spring the rate of flow at which equilibrium is attained may be varied.

Thus in operation the device will maintain the volume of gas which passes in unit time at a constant value provided that static pressure or the pressure on the inlet side of the device also remains constant. If the static pressure is reduced the volume of gas passed in unit time will also be reduced and vice versa, the flow being proportional to the square root of the static pressure. However in all cases the device operates to tend to maintain the volume of flow as near to a predetermined value as possible.

Figure 2:
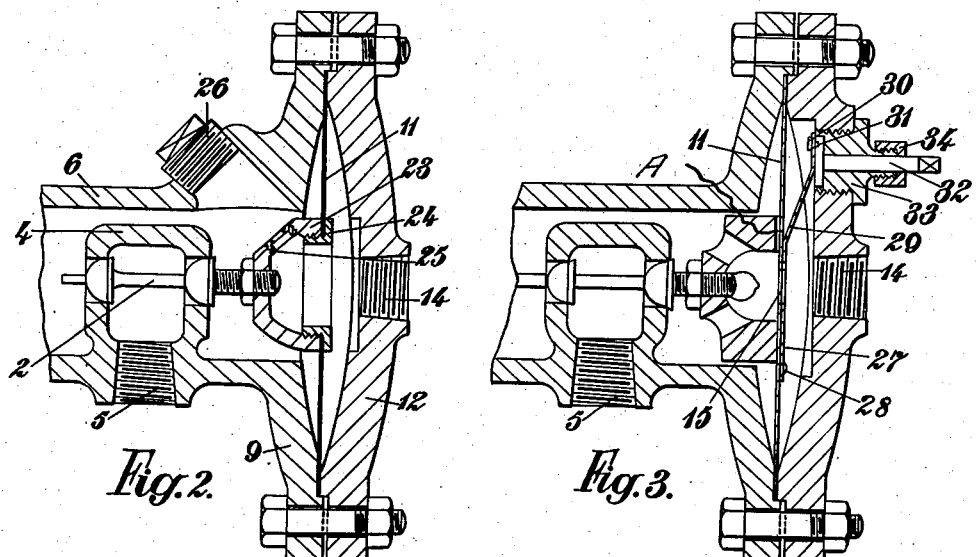
Figure 2 is a cross-sectional elevation, partly broken away, of a modified form of flow controlling device.

In the modified form of the device illustrated in Figure 2 of the drawing the orifice which creates the pressure drop is not formed in the diaphragm itself but in a member 23. The diaphragm is provided with a central aperture of relatively large size to which the member 23 is secured by a clamping ring 24 whereby it is centred in the device. The orifice is formed in a separate member 25 screwed into one of the inclined sides of the member 23 as shown. An inclined opening in the casing 6 is provided in line with the orifice and may be closed by a plug 26. This permits the orifice member 25 to be withdrawn if required by means of a special wrench and thus enables the size of orifice to be changed without dismantling the whole device. The member 23 is attached to the valve spindle 2 in any convenient way, for example by means of a threaded bolt and lock nut as shown, and the mode of operation of the device is the same as described in connection with the embodiment illustrated in Figure 1.

Figure 3:
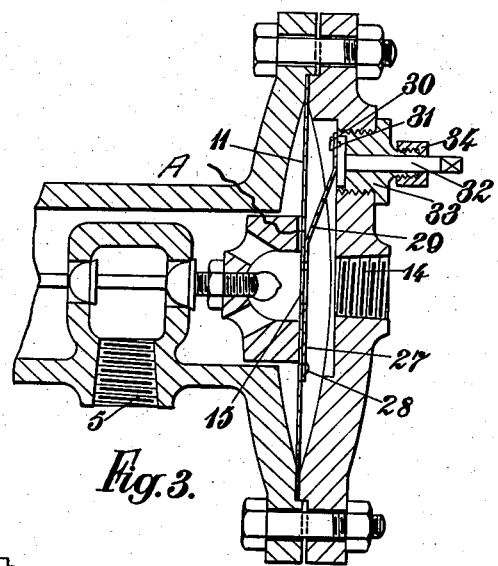
Figure 3 is a cross-sectional elevation, partly broken away, of a device similar to that shown in Figure 1 with the addition of adjustment means.

In the modified form of the device illustrated in Figure 3 the construction is similar to that illustrated in Figure 1 with the addition of means for varying the size of the aperture in the diaphragm without taking the device out of service. For this purpose a slide or shutter 27 is provided, one end being pivoted to the diaphragm at 28 and the other being connected by a flexible arm 29 to a rotatable disc 31 on a spindle 32 seated in a removable plug 33. The spindle 32 extends outside the plug at which point a gland 34 is provided and the projecting end of the spindle is squared as shown so that it may be rotated by the use of a suitable key. The connection between the flexible arm 29 and the rotatable disc may be of the pin and slot or cam type as indicated at 30 and the arrangement is such that by rotating the spindle 32 the shutter 27 may be moved to cut off part of the orifice 15. Preferably the arrangement of the slide is such that in one extreme position of the cam disc 31 the orifice is fully open and in the other extreme position a small opening is obtained.

The flexible arm 29 is preferably made of thin spring steel and the effect upon the differential pressure on the diaphragm due to variations in the tension of this arm over the full travel of the valve is so small that it may be neglected.

The mode of operation of this embodiment is the same as already described in connection with Figure 1.

Figure 4:
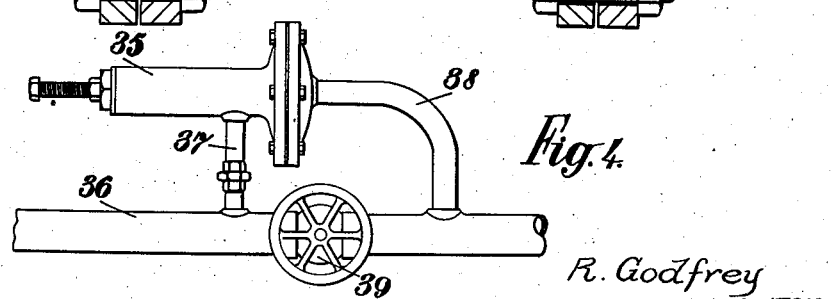
Figure 4 is a plan view showing the flow controlling device connected to an air line and provided with a by-pass valve.

When the device is employed for controlling the supply of lifting gas to a gas lift well it is preferred to adopt the arrangement shown in Figure 4. The device indicated generally at 35 is connected in parallel with the air line from the compressor or other source of supply by means of two branch pipes 37 and 38 and a valve 39 is inserted in the line 36 between the points of connection of the branch pipes aforesaid. When the valve 39 is closed the device 35 is interposed in the supply and will control the quantity of lifting air delivered to the well in the manner previously described. In starting up a well it is usually necessary to employ a higher air pressure than is required for normal operation and a separate compressor or other source of supply is generally provided for "kicking off" the well. During the starting period the valve 39 is opened to bypass the control device and is closed as soon as the well has started to deliver.

Where the lifting air for a number of wells is obtained from a single source, the air supply pipe for each well is fitted with a control device which maintains the flow of air or gas approximately constant regardless of changes in pressure within the individual wells.

It is found that the invention has particular advantages when applied to the control of air or gas to gas lift wells. With the usual hand control the quantity of input air is liable to wide variations due to changes in the casing pressure and an excessive quantity of input air must be used to maintain steady flow conditions and stoppages may also occur. The practice of the invention ensures more economical working and a better ratio of input gas to oil or water and shutdowns are less frequent. Another advantage of the automatic control is that in the event of the valve becoming plugged with scale or other foreign matter the resultant rise in pressure on the outlet side of the diaphragm will cause the valve to open and thus help to clear the obstruction.

Moreover, in the event of a drop in the pressure of the air or gas supply for any reason the valves of the automatic control devices will be opened fully and thus tend to maintain the supply to the wells so that the likelihood of stoppages is reduced and if a shut-down does occur this will be of shorter duration than would have been the case with a hand controlled system.

The construction of the control device is simple and the device is more immune from interference by unauthorized persons than a conventional hand operated valve, this being a consideration in remote or uncivilized countries.

It will be understood that the invention is not confined to the details of the examples described and that such details may be widely varied in the practice of the invention. Thus for example the diaphragm may be of bellows form or of any other convenient shape; if desired a piston or similar arrangement may be employed in place of the diaphragm. The invention is applicable to all situations where control of flow of any kind of fluid is desired in accordance with the principles set forth.

Having now described my invention, what I claim as new and desire to secure by Letters Patent is:

1. A valve device comprising a hollow casing having an inlet opening and an outlet opening, a flexible diaphragm disposed within the casing between the inlet and outlet openings and having a central enlarged opening in its effective flexible part, the central diaphragm opening being opposite the said inlet opening, a cup element secured to the outlet side of the diaphragm and having an obliquely disposed opening in its side wall, the said diaphragm opening communicating with the interior of the cup, a plug removably secured in the said cup opening and having a restricted opening therein, a further plug removably secured in an oblique opening in the casing through which the said apertured plug can be passed, and a valve element controlling the outlet port and movable by the diaphragm.

2. A valve device comprising a hollow casing having an inlet opening and an outlet opening, a flexible diaphragm disposed within the casing and carrying in its effective flexible portion a removable member having a restricted orifice therein and being arranged so that fluid passing through the orifice has unrestricted access to the outlet side of the diaphragm, an opening in the casing aligned with said member for withdrawal thereof and having a removable closure member, and a valve element controlling the outlet port and movable by the diaphragm.

3. A valve device comprising a hollow casing having an inlet opening and an outlet opening, a flexible diaphragm disposed with its flexible part across the hollow interior of the casing between the inlet and outlet openings and having a restricted orifice in its effective portion and arranged so that the effective pressures on the opposite sides thereof are determined by the flow of fluid through the diaphragm, a movable member controlling the outlet opening and movable by the diaphragm and means guiding the said movable member for movement within the casing including a guide member disposed against the outlet side of the diaphragm and having a hollow interior in communication with said restricted orifice but of greater cross sectional area than the latter, the said hollow guide member having a lateral opening affording communication between the interior thereof and the exterior.

RICHARD GODFREY.